Dec. 23, 1958 T. R. THOMAS 2,865,301
LUBRICATION
Filed June 24, 1953 4 Sheets-Sheet 1
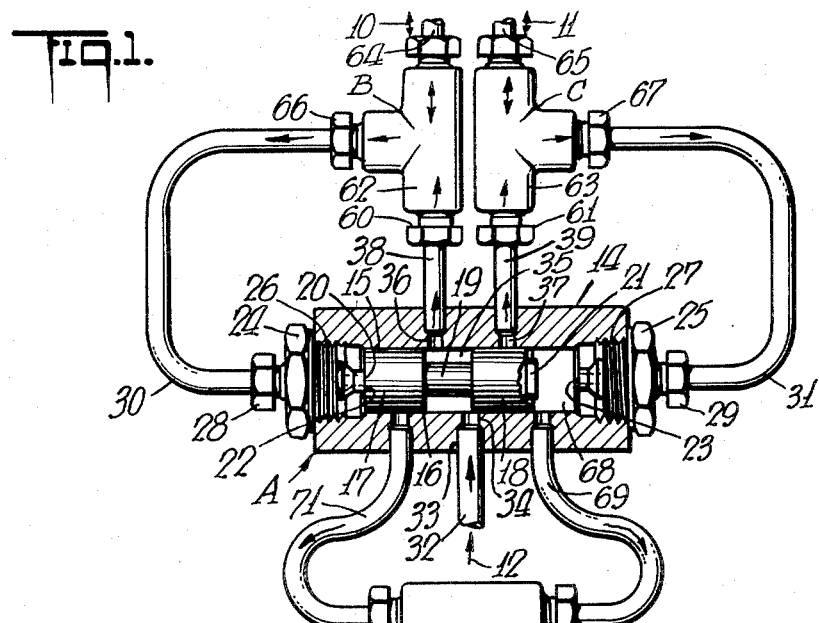
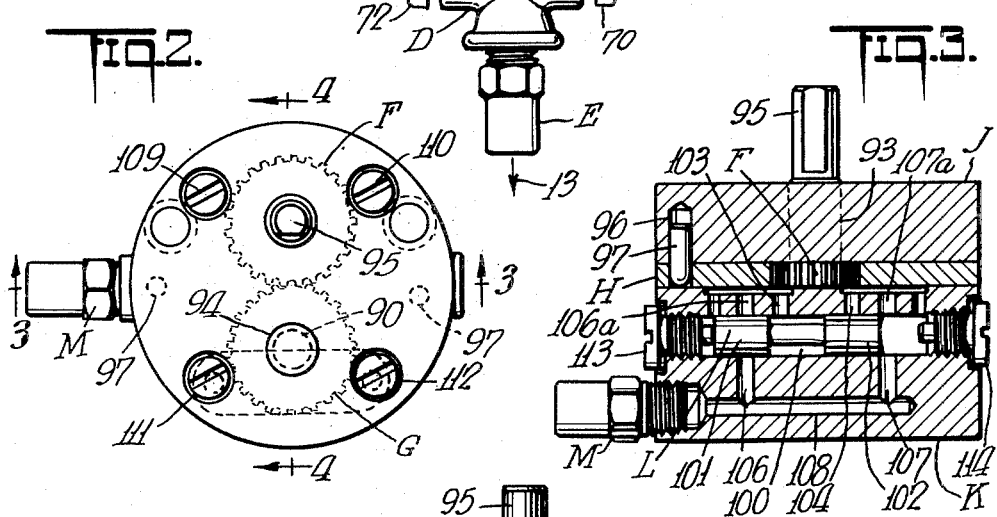
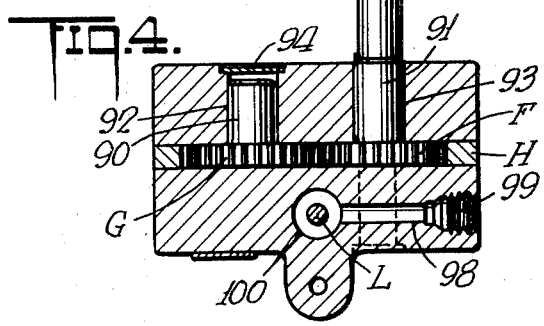
INVENTOR
Thomas R. Thomas
BY
Dean Fairbank Hirsch
ATTORNEYS

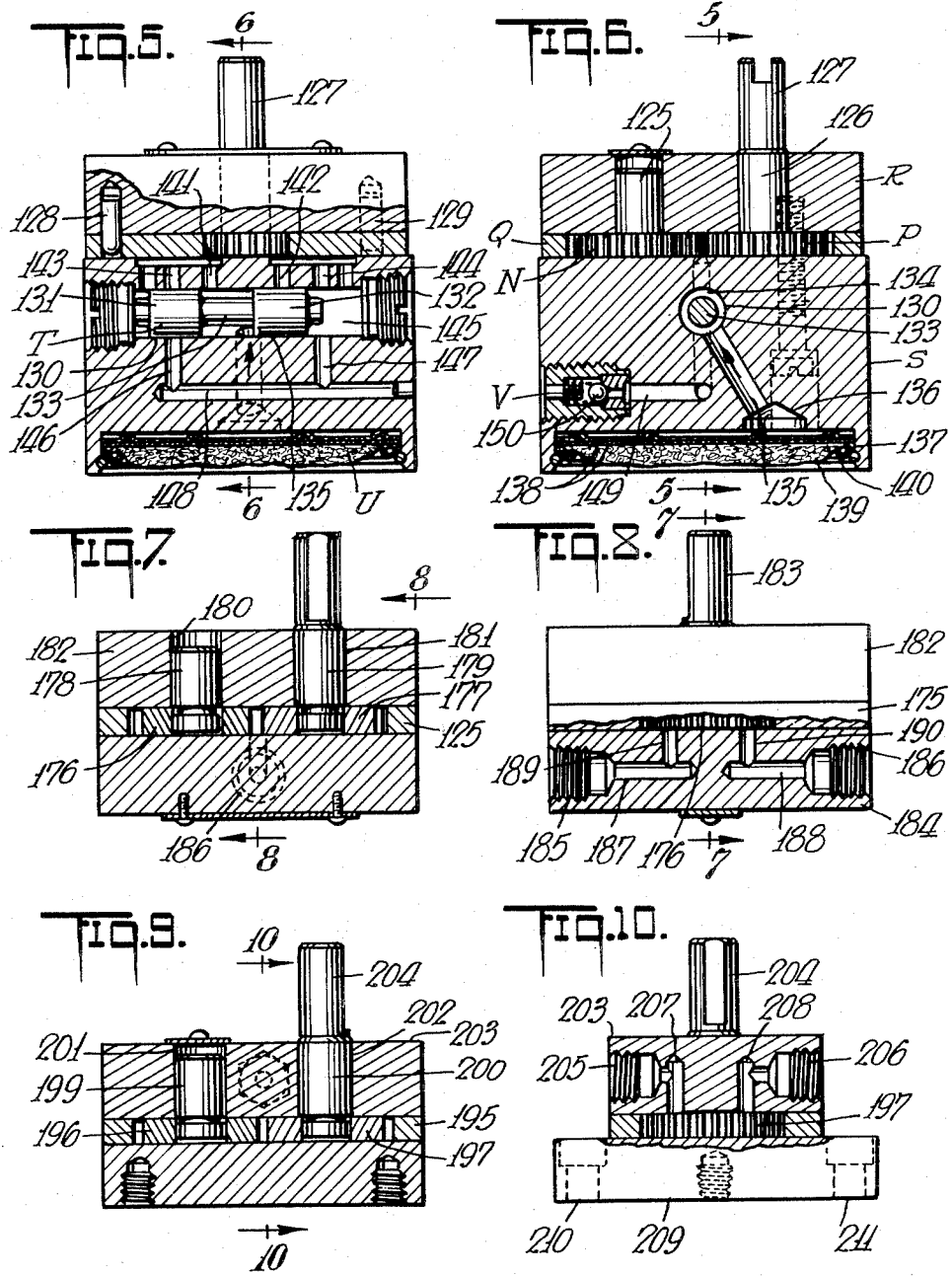

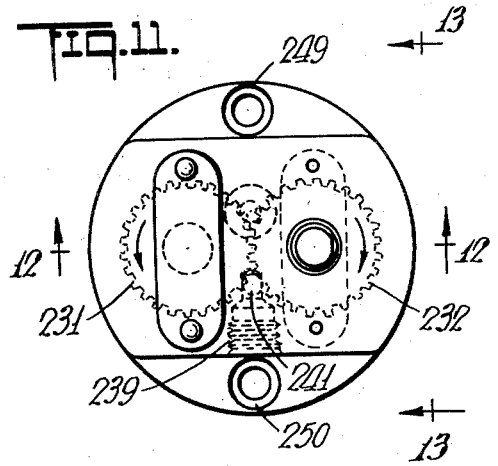
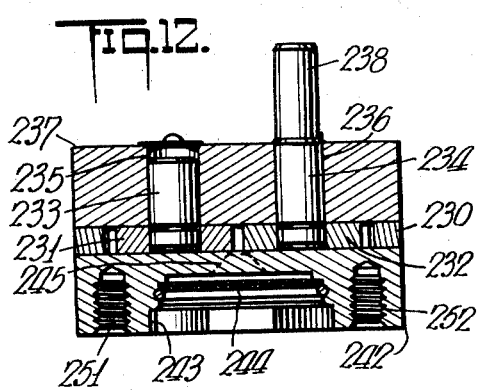
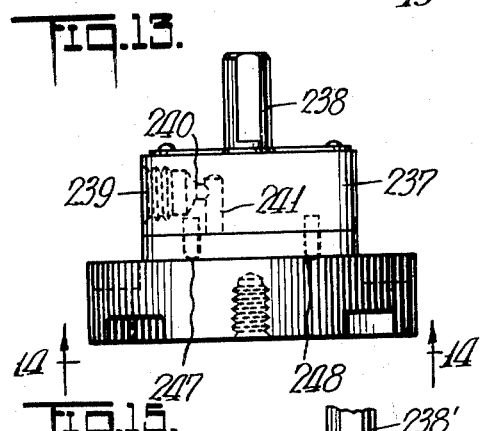
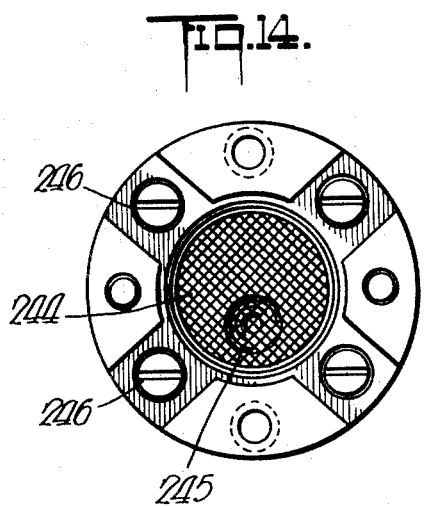
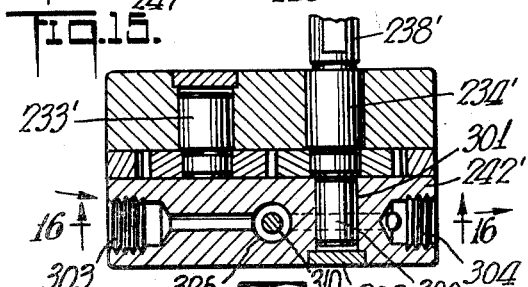
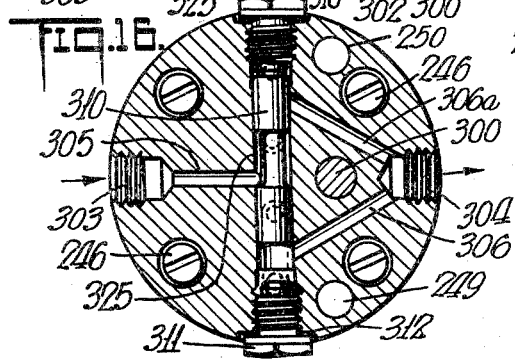
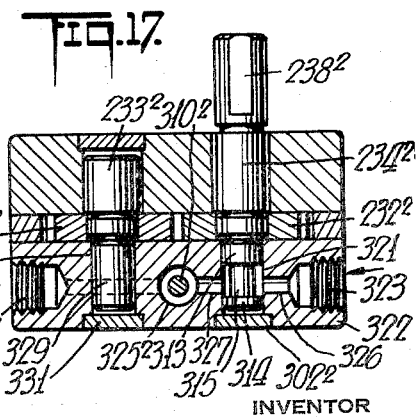

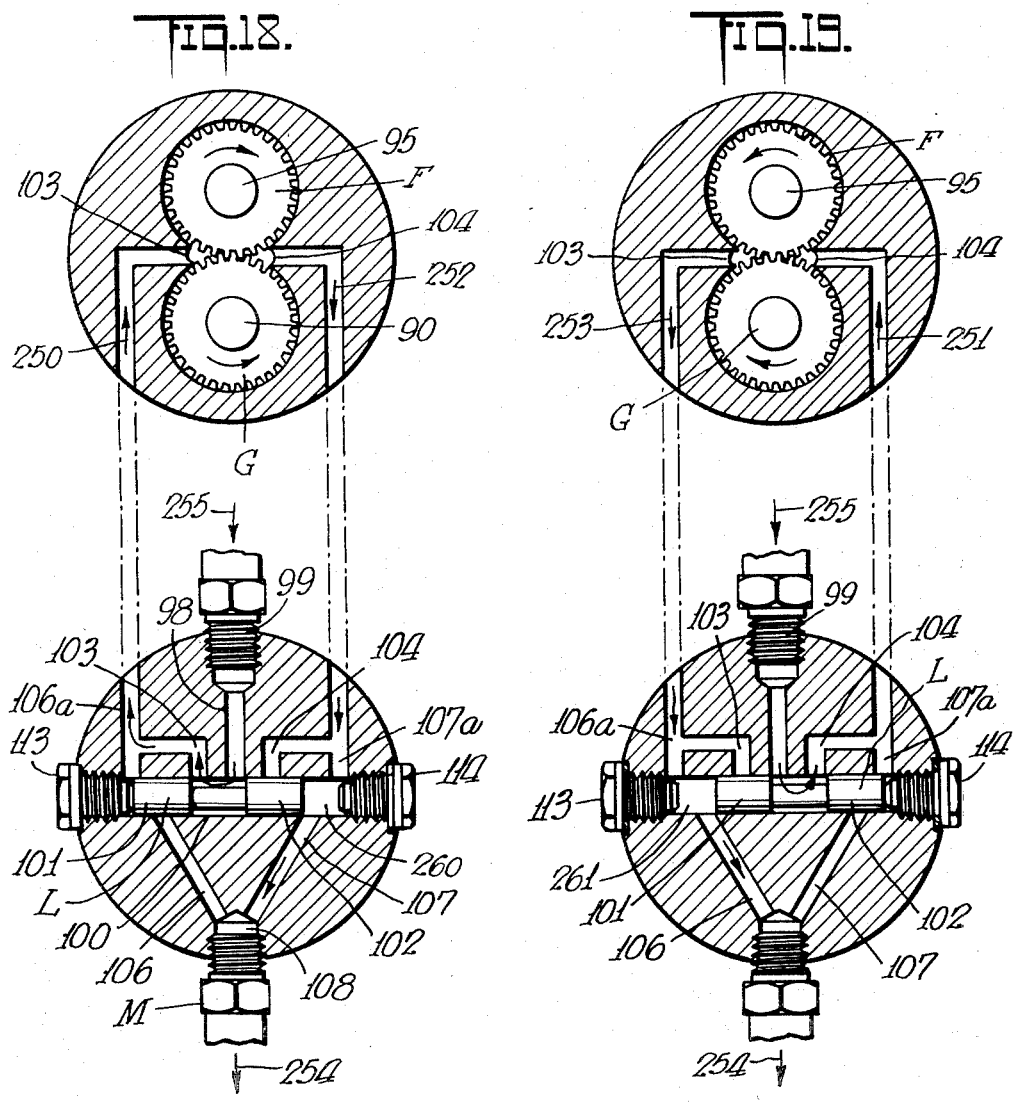

United States Patent Office 2,865,301
Patented Dec. 23, 1958

2,865,301

LUBRICATION

Thomas R. Thomas, Rochelle Park, N. J., assignor to Auto Research Corporation, Boonton, N. J., a corporation of Delaware Application June 24, 1953, Serial No. 363,826

7 Claims. (Cl. 103—117)

The present invention relates to lubrication and it particularly relates to pumping mechanisms for use in centralized lubricating systems.

Although not specifically limited thereto the present invention will be particularly described in its application to reversible type, constant feed gear pumps for centralized lubricating installations particularly of the high restriction flow metering type.

In the preferred embodiment a centralized system is arranged to supply relatively minute yet accurately proportioned quantities of lubricant to the spaced bearings of a mechanism or machine tool with assurance that each bearing will receive its proportionment of lubricant regardless of its distance from the central pressure source, regardless of its height and regardless of the varying obstructing effect to the flow of lubricant that may be encountered in the lubricating lines or in the bearings.

To accomplish these ends the high restriction flow metering outlets, usually of the pin-in-bore type, with an inlet strainer and an outlet check valve, have a high obstruction effect so much greater than that of the tubing or lubricant conduits and the bearings so that in themselves they will predominantly control the proportionment of the metering and the lubricant.

It is among the specific objects of the present invention to provide a novel, constant feed gear pump in assembly of durable inexpensive construction which will afford an adequate pressure feed to such a centralized lubricating system to supply the bearings with the desired amount of lubricant.

In the above central gear pumps for feeding centralized lubricating systems the drive of the gear pump is usually operated by a suitable shaft connected to the machine and driven from one of the operating parts of the machine to be lubricated.

In many types of machines there will be reversal of the various drive shafts and in such case it is desirable to assure proper feed from the gear pump upon reversal of such drive with assurance that the pump even though operating in a reverse direction will nevertheless feed lubricant under pressure into the lubricating system.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to provide a gear pump with a reversible valve construction which shall be effective to reverse the flow of lubricant during the operation of the pump.

Desirably the gear pump is fed from a lubricant reservoir through a strainer, and the lubricant is then fed into a reversing valve chamber from which it flows to the inlet of the branch distributing system.

In the preferred form the gear pump will have two gears and in one direction of the drive the lubricant will be fed under pressure from the gears into the inlet of the lubricating system. When the direction of drive is reversed the reversing valve then automatically will shift its position so that the pressure feed from the gear pump will be received from what was previously the inlet to the gear pump with assurance that the gear pump when driven in either direction will feed lubricant into the inlet of the branch distributing system.

In the preferred form of the invention the reversal of drive will cause the gear pump to throw the reversed valve in an opposite direction, which reversing valve will then reverse the connections between the gear pump into the branch distributing piping system so that the discharge from the gear pump will always flow into the inlet of the distributing system.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a plan view partly in section of the automatic reversing valve for a constant feed gear pump.

Fig. 2 is a top plan view of a double gear feed pump in which the reversing valve may be incorporated in the pump housing or casing.

Fig. 3 is a transverse sectional view upon the line 3—3 of the pump of Fig. 2.

Fig. 4 is a transverse sectional view upon the line 4—4 of the pump of Fig. 2.

Fig. 5 is a transverse vertical sectional view similar to Fig. 3 of an alternative form of combined pump and reversing valve construction taken upon the line 5—5 of Fig. 6.

Fig. 6 is a transverse vertical sectional view of the pump of Fig. 5 upon the line 6—6 of Fig. 5.

Fig. 7 is a transverse vertical sectional view of a pump construction which may be associated with an external reversing valve as shown in Fig. 1 taken upon the line 7—7 of Fig. 8.

Fig. 8 is a transverse sectional view upon the line 8—8 of Fig. 7.

Fig. 9 is a transverse vertical sectional view of an alternative form of gear pump construction which may be associated with the external reversing valve of Fig. 1.

Fig. 10 is a transverse vertical sectional view upon the line 10—10 of Fig. 9.

Fig. 11 is a top plan view of an alternative constant feed gear pump assembly of the sump type which may be associated with the reversing valve of Fig. 1.

Fig. 12 is a transverse vertical sectional view upon the line 12—12 of Fig. 11.

Fig. 13 is an end elevational view upon the line 13—13 of Fig. 11.

Fig. 14 is a bottom plan view taken from the line 14—14 of Fig. 13.

Fig. 15 is a transverse sectional view similar to Fig. 12 of an alternative embodiment showing the drive shaft to one of the gears of the gear pump having a bearing on both sides of the double gear chamber.

Fig. 16 is a transverse sectional view upon the line 16—16 of Fig. 15.

Fig. 17 is a transverse sectional view similar to Figs. 12 and 15 showing the shafts of both gear pumps having bearings on both sides of the gear chamber.

Figs. 18 and 19 are diagrammatic views illustrating the operation of the device of Figs. 2, 3 and 4 and showing the positions and rotations of the gears with different positions of the reversing valve L.

Referring to Fig. 1 there is shown a reversing valve A provided with the junctions B, C and D and an outlet check valve E.

The lubricant flow to and from a gear pump such as shown in Figs. 7 to 10 are indicated at 10 and 11. The lubricant enters as indicated at 12 and will leave through the check valve as indicated at 13, the direction of flow otherwise being controlled by the reversing valve A.

The reversing valve A has the cylindrical body 14 with the central bore 15 receiving the reciprocating valve plunger member 16. The member has two enlarged head portions 17 and 18 connected by the reduced diameter stem 19. The outside ends of the heads carry the sealing elements 20 and 21 which are designed to seal the face portions 22 and 23 of the end screw plugs 24 and 25.

These screw plugs 24 and 25 are screwed into the tapped end sockets 26 and 27. The central portions of the plugs 24 and 25 are provided with the compression coupling connections 28 and 29 to the tubing 30 and 31.

The inlet tube 32 is fitted into the recess 33 and is soldered in position in said recess. This recess will communicate with the bore 34 which in turn will feed into the central chamber 35 between the enlarged head portions 17 and 18.

From the chamber 35 the lubricant will flow either into the bore 36 or the bore 37 and into either the tube 38 or the tube 39, depending upon the position of the valve 16.

The tubes 38 and 39 are soldered into recesses in the sides of the block 14 of the valve A.

The tubes 38 and 39 are connected by the compression coupling connections 60 and 61 into the portions 62 and 63 of the T junctions B and C.

The lubricant will then either flow to or from the gear pump by the piping connections or tubing connections 64 and 65. The outflow from the junctions B and C will be into the tube 30 or 31 which are connected to the stems of the T's B and C by the compression coupling connections 66 and 67.

From the tubing 30 and 31 the lubricant will flow into one of the end chambers left by movement of the valve 16 to the other end of the passage 15 for example.

In Fig. 1 the chamber 68 has been left by movement of the valve to the left.

From the chamber 68 lubricant will flow into the tube 69 which is coupled at 70 to the junction D.

When the valve 16 is at its other position or in its right-hand extreme position the lubricant will flow into the tube 71, which is provided with a compression coupling connection 72 to the T D. From the T D the lubricant will flow through check valve E and thence to the centralized lubricating installation as indicated at 13.

In Fig. 1 is shown an outside reversing valve.

In Figs. 2 to 4 the reversing valve is incorporated in the gear pump housing.

Referring to Figs. 2 to 4 the gears F and G mesh with each other and are positioned in a central plate H.

The pump has an upper plate J and a lower plate K which carries the reversing valve L. The central plate H has recesses to receive the gears F and G which feed the lubricant under presure to the outlet check valve M. The gears F and G respectively have the bearing shafts 90 and 91 which rotate in the bearing recesses 92 and 93 in the plate J. The recess 92 is covered by the plate 94.

The shaft 91 has an extension 95 by means of which the gear pump is driven. The recess 96 and the pins 97 will assure correct position and alignment of the gear pump.

The lower element K carries a feed or inlet passage 98 to which connection may be made at the tapped inlet socket 99.

The bore 98 will feed into the chamber 100 between the enlarged head portions 101 and 102 of the reciprocating valve L.

The lubricant will then pass by the bores 103 or 104 to the meshing gears F and G.

In flowing outwardly the lubricant will pass through the bores 106a or 107a through the end chambers left by the valve L and then into either bore 106 or 107.

From the bore 106 or 107 the lubricant will flow under pressure into the longitudinal or transverse bore 108 and past the outlet check valve M.

The three plate elements J, H and K are held together by means of the screws 109, 110, 111 and 112. The ends of the valve chamber are sealed by the plugs 113 and 114.

In operation the valve L may reverse the flow of lubricant from the inlet 99 to either side of the gear pump F—G, so that the lubricant flowing out through the check valve M will flow through a different series of internal bores either 105 or 107 in the position shown or bores 104 and 106 in the alternative position.

Figs. 18 and 19 show diagrammatically the operation of Figs. 2, 3 and 4. In Fig. 18 is shown a driving gear F on shaft 95 which may drive in clockwise direction in Fig. 18 and in counter-clockwise direction in Fig. 19.

In Fig. 18 the port 103 is an oil inlet port while the port 104 is an outlet port. In Fig. 19 the port 104 is an inlet port and the port 103 is an outlet port. It will be noted that the flow is always inward at 255 and always outward at 254 in Figs. 18 and 19 regardless of the direction of rotation of the gears F and G.

In the drive direction of Fig. 18 the flow-in is through the passageway 106a as indicated by the arrow 250 and outlet through the passage 107a, as indicated by the arrow 252.

It will be noted that this flow also forces lubricant under pressure against the righthand faces of the cylindrical enlargements 101 and 102 of the piston L with the chamber 260 being under pressure.

Now, if the gears are reversed as shown in Fig. 18, suction will be created in the chamber 260 since the gears will be drawing upon the passageway 107a and then the piston L will be moved to the right with the pressure then being applied to the lefthand side of the enlargements 101 and 102 of the piston L, with the opposite chamber 261 being under pressure.

The piston in Fig. 19 will close the ports indicated at 103 and 107 and will open the ports indicated at 104 and 106.

On the other hand, in the arrangement shown in Fig. 18, the piston closes the ports 106 and 104 and opens the ports 103 and 107a. Thus, the double piston L automatically reverses itself to the proper position.

In the gear pumps shown in Figs. 5 and 6 the gears N and P are held in the plate Q. The plate Q is held between the upper casing element R and the lower casing element S. The plate S carries the reciprocating valve T and it also carries the strainer inlet U and the outlet check valve unit V.

As shown the gears N and P have the bearing shafts or studs 125 and 126. The shaft 126 has the driving connection 127. The location studs 128 and 129 will correctly locate the plate R in respect to the plate Q. The valve T will reciprocate in the chamber 130 and it is provided with the enlarged head portions 131 and 132 with a connecting stem 133. This stem will have an intermediate chamber 134.

The lubricant will flow to the intermediate chamber 134 from the lubricant passage 135. This passage receives lubricant from the socket or recess 136 and the strainer U.

The strainer U is received in the recess 137 at the bottom of the plate S.

The recess 137 has the two backing screens 138, the felt filter 139 and the retaining rings 140.

From the chamber 134 lubricant will flow through either passage 141 or 142 to the gear pump N—P. From the gear pump the lubricant will flow through either passage 143 or 144 through an end chamber 145, and then through either bore 146 or 147 and into the bore 148. From the bore 148 it will flow through the transverse bore 149 to the outlet check valve unit V. The outlet check valve unit V receives the spring sealed ball check 150.

In operation the units of Figs. 5 and 6 will operate substantially the same as that of Figs. 2 to 4 except that the strainer is positioned within the gear pump mount and the entire gear pump unit may be placed directly into a lubricant pool or into the lower part of a lubricant reservoir.

In the embodiment of Figs. 7 and 8 there is a central plate 175 receiving the meshing gear units 176 and 177.

The gears 176 and 177 are provided with the bearing shafts 178 and 179 which fit into recesses 180 and 181 in the upper plate 182.

The shaft 179 has a driving connection 183. The lower plate 184 has the alternative inlet and outlet connections 185 and 186 which may be connected to the tubes 64 and 65 of Fig. 1. The lubricant will flow from either connection made to sockets 185 and 186, the bores 187 and 188 and the vertical bores 189 and 190, to or from the meshing gears 176 and 177. The lubricant flow to the gear pump 176 and 177 will of course be varied by the change in position of the double headed valve of Fig. 1.

In the embodiment of Figs. 9 and 10 there is a central plate 195 receiving the meshing gear pump units 196 and 197. These units are provided with the shafts 199 and 200 fitting in the bearing recesses 201 and 202 in the upper plate 203.

The shaft 200 has the drive extension 204. The upper plate 203 also has the inlet and outlet sockets 205 and 206 with the feed or outlet passages 207 and 208 to the meshing gears 196—197. The gear chamber or plate 195 is closed off by the lower section 209 which has the attachment or mounting recesses 210 and 211.

Connection to the inlet and outlet recesses 205 and 206 may be made by the tubing connection 64 and 65 of Fig. 1.

Referring to the embodiment of Figs. 11 to 14 there is shown a constant feed gear pump assembly of the sump type with a clockwise drive. The central plate 230 receives the gears 231 and 232 having the bearing shafts 233 and 234. These shafts ride in the recesses 235 and 236 in the upper plate 237. The shaft 234 has an extension 238.

The upper plate 237 has the outlet connection 239 and the feed passages 240 and 241. In the tapped recess 239 there may be positioned an outlet check valve. The lower plate 242 has a recess 243 receiving the strainer 244. The lubricant passes the strainer and then into the socket 245 in its way to the gear pump 231—232.

The screws 246 enable a tight assembly while the dowel pins 247 and 248 assure correct relationship between the parts.

The stepped openings 249 and 250 enable the mounting of the gear pump of Figs. 11 to 14. The alternative tapped holes 251 and 252 in Fig. 12 also permit another means of fastening or installation of the pump.

In Figs. 15 and 16 similar functioning parts as those shown in Fig. 12 are indicated by the same numerals primed. It will be noted that the shaft 234' has an extension at 300 into the lower pump element 242'. This extension 300 will bear in the bearing recess 301 in the element 242'. This recess 301 is closed by the plate 302.

In Figs. 15 and 16 the inlet to the pump is indicated at 303 and the outlet is indicated at 304. The inlet 303 and the outlet 304 will be the same regardless of the drive. The lubricant will flow from the inlet 303 into passage 305, to piston passage 325 on through the holes held open by the reversing piston 310, then through the gear pump and the passages 306 to outlet connection 304, regardless of the direction of drive.

The reversing piston 310 is confined in the passage chamber 325 by plugs 311 and gaskets 312.

Referring to Fig. 17 similarly functioning parts as in Figs. 12, 15 and 16 are indicated by the same numerals provided with a superior $^2$.

The shaft $238^2$ has the stub shaft extensions 313, 314 and reduced portion 315, of which 313 and 314 are the upper and lower bearing elements rotating in the recess 321 of the lower pump element 322, while the undercut portion 315 permits oil flow from passage 326 to passage 327. The recess 321 is closed by the plate 328.

The lubricant will flow in through the inlet 323 and out through the outlet 324, regardless of the direction of drive of the gear pump. It will be noted that the lubricant from passage $325^2$ will pass through holes similar as in Fig. 16 to the outlet connection 324.

In passing through the chambers 326 and 327 the lubricant will lubricate the bearings 313 and 314.

The shaft $233^2$ is also provided with a lower extension 329 in the recess 330 in the lower gear pump element 322. The recess 230 is closed by the plate 331.

It will be noted that in the embodiments of Figs. 1 to 17 that as soon as the gear pump reverses it will automatically throw the reciprocating piston 17—18 of Fig. 1, 101—102 of Fig. 3, 131—132 of Fig. 5, and 310 of Fig. 16 to a reverse position to assure that the feed of lubricant from the pump will always be to the inlet of the lubricating system.

The applicant has provided a simple, readily assembled gear pump unit which may be readily mounted in reservoir or lubricant pumps and which will feed lubricant as desired according to the requirements of a centralized lubricating installation.

As many changes could be made in the above lubrication and many widely different embodiments of this invention could be made without departing from the scope of the claims, it is intended that all matter contained in the above description shall be interpreted as illustrative and not in a limiting sense.

Having now particularly described an ascertained the nature of the invention, and in what manner the same is to be performed, what is claimed is:

1. A centralized lubricating gear pump comprising a central plate element having recesses for the meshing pump gears, and upper and lower cover plates and a reversing valve to reverse flow of lubricant to and from said pump, said cover plates carrying the reversing valve having a single inlet at one side of the valve and a single outlet at the other side of the valve and said reversing valve having a central reduced diameter portion and end portions and branched bores extending from the inlet to the valve having one branch leading to the central reduced diameter portion and the other branch leading to an end of the valve.

2. A centralized lubricating gear pump comprising a central plate element having recesses for the meshing pump gears, and upper and lower cover plates and a reversing valve to reverse flow of lubricant to and from said pump, one of said cover plates carrying both the inlet and the outlet having a strainer, said cover plates carrying the reversing valve having a single inlet at one side of the valve and a single outlet at the other side of the valve and said reversing valve having a central reduced diameter portion and end portions and branched bores extending from the inlet to the valve having one branch leading to the central reduced diameter portion and the other branch leading to an end of the valve.

3. A centralized lubricating gear pump comprising a central plate element having recesses for the meshing pump gears, and upper and lower cover plates and a reversing valve to reverse flow of lubricant to and from said pump, one of said cover plates having a recess receiving said reversing valve, said cover plates carrying the reversing valve having a single inlet at one side of the valve and a single at the other side of the valve and said reversing valve having a central reduced diameter portion and end portions and branched bores extending from the inlet to the valve having one branch leading to the central reduced diameter portion and the other branch leading to an end of the valve.

4. A centralized lubricating gear pump comprising a central plate element having recesses for the meshing pump gears, and upper and lower cover plates and a reversing valve to reverse flow of lubricant to and from said pump, one of said cover plates having both lubricant feed connections for the pump and also having lubricant outlet connections from the pump, said cover plates carrying the reversing valve having a single inlet at one side of the valve and a single outlet at the other side of the valve and said reversing valve having a central reduced diameter portion and end portions and branched bores extending from the inlet to the valve having one branch leading to the central reduced diameter portion and the other branch leading to an end of the valve.

5. A centralized lubricating gear pump comprising a central plate element having recesses for the meshing pump gears, and upper and lower cover plates and a reversing valve to reverse flow of lubricant to and from said pump, said reversing valve consisting of a double headed member reciprocating in a cylindrical bore in a valve body, said valve being provided with alternative inlet and outlet passages to the pump gears, said cover plates carrying the reversing valve having a single inlet at one side of the valve and a single outlet at the other side of the valve and said reversing valve having a central reduced diameter portion and end portions and branched bores extending from the inlet to the valve having one branch leading to the central reduced diameter portion and the other branch leading to an end of the valve.

6. A centralized lubricating gear pump comprising a central plate element having recesses for the meshing pump gears, and upper and lower cover plates, and a reversing valve to reverse the flow of lubricant to and from said pump, one of said cover plates carrying both the inlet and the outlet and said last mentioned cover plate being recessed and a strainer positioned in said recess, said gears consisting of reversible rotating gear members and said valve being an automatic reversing valve to assure flow out through the outlet and flow in through the inlet regardless of the direction of rotation of the gear pump, said last mentioned plate element having a diametral through cylindrical passage to serve as a piston cylinder for the valve and said valve having separated spaced cylindrical piston members having a connecting reduced diameter stem reciprocating in said cylinder, stop members positioned in the ends of said cylinder, outlet bores from the ends of the cylinder to said outlet, and a single inflow bore to the middle of the cylinder from the inlet and reversible flow bores each having double branch connections to said cylinder, the middle portion of the space between the piston members permitting inflow between the inflow bore and one of the reversible flow bores and the open end of the cylinder permitting flow between the branch portion of the other reversible flow bore and the outlet.

7. The pump of claim 6, the cylinder having threaded end plugs with nipples to act as stops in respect to the pistons.

References Cited in the file of this patent

UNITED STATES PATENTS

| | | |
|---|---|---|
| 1,470,804 | Buckingham | Oct. 16, 1923 |
| 1,881,554 | Heckert | Oct. 11, 1932 |
| 2,292,331 | Vertson | Aug. 4, 1942 |
| 2,298,457 | Berges | Oct. 13, 1942 |
| 2,607,295 | Drucker | Aug. 19, 1952 |
| 2,621,593 | Schmiel | Dec. 16, 1952 |
| 2,634,679 | Kern | Apr. 14, 1953 |
| 2,661,695 | Ferris | Dec. 8, 1953 |
| 2,784,555 | Anderson | Mar. 12, 1957 |